United States Patent
Barlsen et al.

(10) Patent No.: US 9,352,684 B2
(45) Date of Patent: May 31, 2016

(54) METHOD AND CONTROL DEVICE FOR SIGNALING A BRAKING PROCESS ON A TRAILER VEHICLE

(75) Inventors: Holger Barlsen, Langenhagen (DE);
Bjorn Bleckmann, Hannover (DE);
Rainer Risse, Pattensen-Reden (DE);
Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 58 days.

(21) Appl. No.: 14/237,412

(22) PCT Filed: Jun. 9, 2012

(86) PCT No.: PCT/EP2012/002450
§ 371 (c)(1),
(2), (4) Date: Feb. 6, 2014

(87) PCT Pub. No.: WO2013/029702
PCT Pub. Date: Mar. 7, 2013

(65) Prior Publication Data
US 2014/0172261 A1 Jun. 19, 2014

(30) Foreign Application Priority Data
Aug. 30, 2011 (DE) .......................... 10 2011 111 904

(51) Int. Cl.
*B60Q 1/44* (2006.01)
*B60Q 1/30* (2006.01)
*B60Q 1/52* (2006.01)

(52) U.S. Cl.
CPC ............... *B60Q 1/444* (2013.01); *B60Q 1/305* (2013.01); *B60Q 1/44* (2013.01); *B60Q 1/52* (2013.01)

(58) Field of Classification Search
None
See application file for complete search history.

(56) References Cited

U.S. PATENT DOCUMENTS

| 2002/0021213 | A1 | 2/2002 | Ehrlich | |
|---|---|---|---|---|
| 2002/0047778 | A1 | 4/2002 | Ehrlich et al. | |
| 2003/0117011 | A1* | 6/2003 | Ackley | B60T 13/686 303/7 |
| 2007/0241874 | A1* | 10/2007 | Okpysh | B60Q 1/444 340/479 |
| 2008/0143179 | A1* | 6/2008 | Rutherford | B60T 7/20 303/160 |
| 2010/0066528 | A1* | 3/2010 | Kim | B60Q 1/447 340/479 |
| 2012/0283925 | A1* | 11/2012 | Barlsen | B60Q 1/305 701/70 |

FOREIGN PATENT DOCUMENTS

| DE | 102010034745 | * 8/2010 | ............... B60Q 1/00 |
|---|---|---|---|
| WO | WO 2011/072780 A1 | 6/2011 | |

* cited by examiner

*Primary Examiner* — John R Olszewski
*Assistant Examiner* — Jess Whittington
(74) *Attorney, Agent, or Firm* — Kramer Levin Naftalis & Frankel LLP

(57) ABSTRACT

In a method for signaling a braking process on a trailer vehicle coupled to a towing vehicle, at least one light on the trailer is actuated with an emergency brake signal during emergency braking and with a normal signal during a different driving state. The emergency brake signal causes a different actuation of the light than does the normal signal. The light can be actuated by a control signal of the towing vehicle, and the actuation state of the light can be influenced by at least one control device on the trailer. The control device detects the control signal generated by the towing vehicle and fed to the trailer to actuate the light, and analyzes the control signal. If it detects that the control signal is an emergency brake signal, it does not carry out a dedicated actuation of the light, or it effects a different actuation of the light than in other cases.

6 Claims, 3 Drawing Sheets

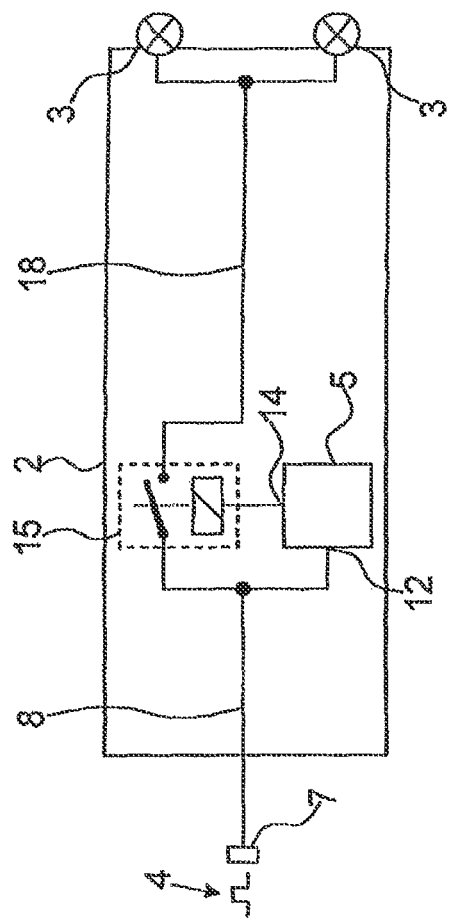
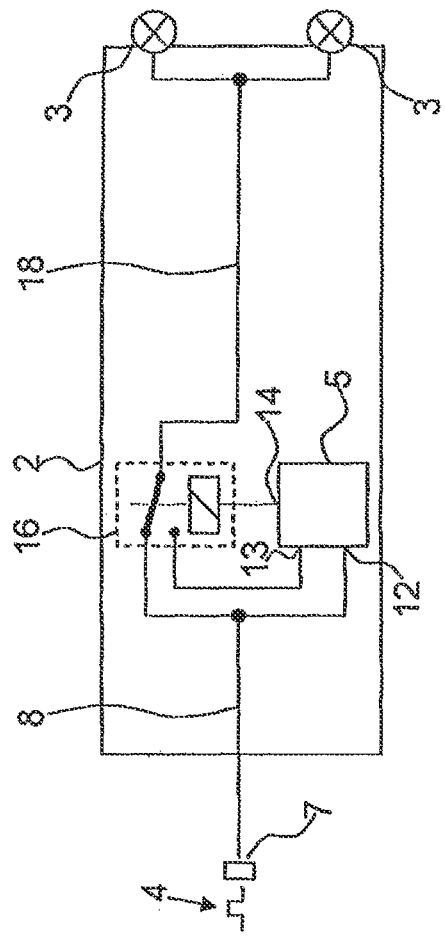

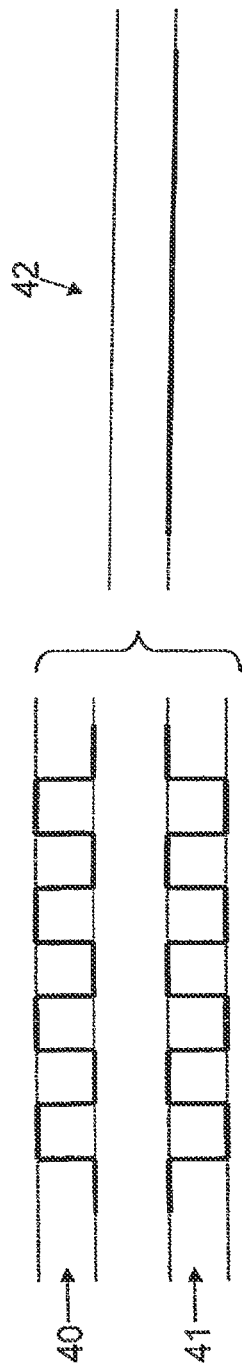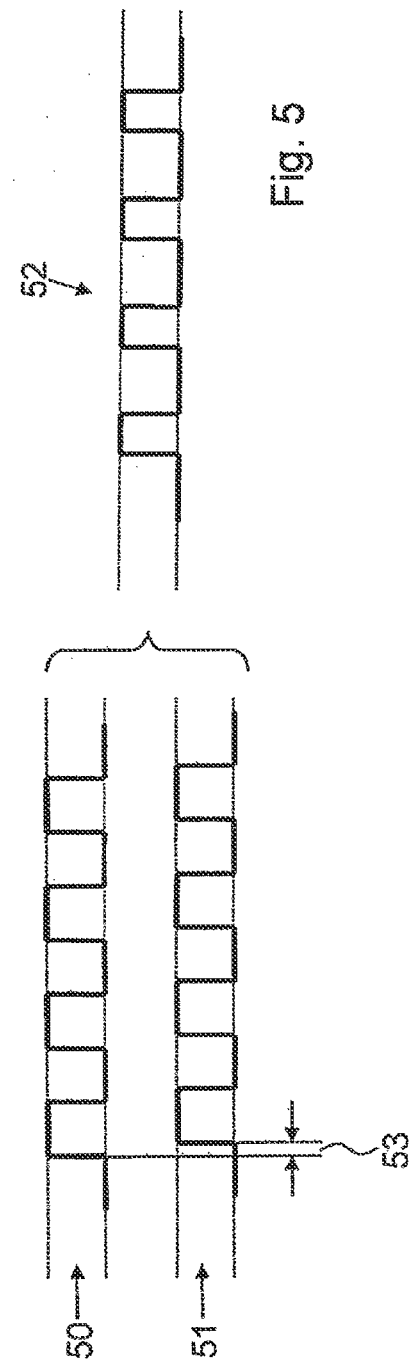

METHOD AND CONTROL DEVICE FOR SIGNALING A BRAKING PROCESS ON A TRAILER VEHICLE

FIELD OF THE INVENTION

The invention generally relates to the field of signaling vehicle braking processes, and, more particularly, to a method and control device for signaling a braking process on a trailer vehicle.

BACKGROUND OF THE INVENTION

Signaling emergency braking by means of a brake light differently from other braking that is not emergency braking (normal braking) is known. Whereas, for normal braking, a brake light is, e.g., switched on continuously, when signaling emergency braking, e.g., pulsed control of the brake light takes place, which results in the brake light outputting a flashing signal. If the vehicle consists of a towing vehicle and a trailer vehicle coupled thereto, as is generally the case in the field of commercial vehicles, there is a need to signal the emergency braking visually not only on the towing vehicle but also on the trailer vehicle, because the trailer vehicle substantially conceals the brake lights of the towing vehicle from following vehicles. In this case, the brake light signal of the towing vehicle can present the emergency braking signal in the event of emergency braking, and the corresponding electrical operation of the brake lights of the towing vehicle can be electrically forwarded to the trailer vehicle, so that the emergency braking signal can also be presented using the brake lights of the trailer vehicle. As another possibility, the trailer vehicle itself can generate an emergency braking signal, e.g., if an electronic brake system installed in the trailer vehicle records unusually heavy braking using deceleration signals. In this case, signaling of emergency braking using brake lights of the trailer vehicle is also possible if the trailer vehicle is coupled to a towing vehicle that has no function for generating an emergency braking signal. This is, e.g., the case with older towing vehicles. However, a trailer vehicle improved in this way would not be compatible with a towing vehicle providing separate generation of an emergency braking signal.

SUMMARY OF THE INVENTION

Generally speaking, it is an object of the present invention to provide a method and control device for signaling a braking process on a trailer vehicle that can be operated with towing vehicles of any construction, i.e., with and without separate emergency braking signal generation functionality.

In a method for signaling a braking process on a trailer vehicle coupled to a towing vehicle according to an embodiment of the present invention, at least one light disposed on the trailer vehicle is operated during emergency braking with an emergency braking signal and is operated in another driving state with a normal signal, and the emergency braking signal causes a different operation of the light than the normal signal. The light disposed on the trailer vehicle can be operated both by a control signal of the towing vehicle and can also be influenced in its operating state by at least one control device disposed on the trailer vehicle. The control device detects and analyzes a control signal for operating the light generated by the towing vehicle and supplied to the trailer vehicle and, on detecting that the control signal is an emergency braking signal, does not perform a separate operation of the light or performs a different operation than in other cases.

Advantageously, with relatively low technical complexity, and therefore inexpensively, braking processes can be signaled on a trailer vehicle, whereby, independently of the implementation of the towing vehicle to which the trailer vehicle is coupled, both emergency braking and also normal braking or a different driving state can be signaled to the following traffic using the light disposed on the trailer vehicle, and the light signals generated thereby still remain unambiguously distinguishable for the following traffic. The following traffic can clearly distinguish between emergency braking and normal braking or other driving states using the light output by the light irrespective of which embodiment of towing vehicle is coupled to the trailer vehicle, in particular, irregular, intermittent light patterns, complete cancellations of light controls or other ambiguously defined light signals are avoided.

It will be appreciated that the present invention therefore contributes to improving traffic safety. In addition, it contributes to reduced transportation costs, because it enables trailers to be coupled to any towing vehicles.

Another advantage of the invention is that it is also suitable for vehicle combinations with a plurality of trailers. In such cases, at least one further trailer vehicle is coupled behind the trailer vehicle that is directly coupled to the towing vehicle. The additional trailer vehicle can also be equipped to implement the method according to an embodiment of the invention. The control device provided in the additional trailer vehicle either receives the control signal indirectly from the towing vehicle of the vehicle combination or directly receives a control signal of the first trailer vehicle, or, in the case of more than two trailers, of the upstream trailer vehicle.

The visual signaling of emergency braking can take place by means of the light, e.g., by using intermittent control, e.g., using a pulsed control signal, which causes flashing of the light, whereas, during normal braking continuous, uninterrupted operation of the light or intermittent operation of the light at a different frequency is carried out. The difference between emergency braking and normal braking can also be achieved by means of different brightness levels of the light output of the light.

The light disposed on the trailer vehicle can, e.g., be a brake light or a flashing light (vehicle turn indicator). One or more lights of the trailer vehicle can be operated for signaling emergency braking or normal braking (it is advantageous here to operate rear lights of the trailer vehicle).

Also, flashing lights of the trailer vehicle on both sides can be switched on or can be switched on intermittently for signaling emergency braking.

If the light disposed on the trailer vehicle is a brake light, it is advantageous that the control signal of the towing vehicle is a brake light signal, in this case, at least one brake light disposed on the trailer vehicle is operated during emergency braking with an emergency braking signal, and, for braking other than emergency braking, with a normal braking signal. The emergency braking signal causes different operation of the brake light than the normal braking signal. The brake light disposed on the trailer vehicle can both be operated by a brake light signal of the towing vehicle and can also be influenced in its operating state by at least one control device disposed on the trailer vehicle. The control device detects and analyzes a brake light signal generated by the towing vehicle and supplied to the trailer vehicle for operating the brake light, and, on detecting that the brake light signal is an emergency braking signal, does not perform a separate operation of the brake light or performs a different operation than in other cases.

According to an embodiment of the present invention, the control device determines whether a braking process of the trailer vehicle is emergency braking or not emergency braking using at least one sensor signal supplied to the control device of at least one sensor disposed on the trailer vehicle and/or based on braking data supplied to the control device from the towing vehicle. The light disposed on the trailer vehicle is operated with an emergency braking signal generated by the control device at least in those cases in which the control device does not detect that the control signal generated by the towing vehicle and supplied to the trailer vehicle is an emergency braking signal. This has the advantage that the trailer vehicle can autonomously carry out signaling of emergency braking for the following traffic. This also warns the following traffic of emergency braking even with towing vehicles or upstream trailers that do not support corresponding signaling of emergency braking.

Thus, the control device can, e.g., determine at least one braking value associated with the braking process, such as, e.g., an actual speed, an actual deceleration, a target deceleration, a braking demand signal from the towing vehicle or information about an automatic braking intervention, and can compare the same with a limit value. If the limit value is exceeded, it is a case of emergency braking and the control device generates the emergency braking signal. The control device itself can determine the actual speed and the actual deceleration, e.g., using data from wheel revolution rate sensors, such as are known in ABS systems. A target deceleration can, e.g., be supplied via a data interface from the towing vehicle to the control device of the trailer vehicle. A braking demand signal can likewise be supplied via the data interface to the control device from the towing vehicle.

The control device disposed on the trailer vehicle can be a separate control device or the control device of an electronically controlled brake system. If a separate control device is provided, it is advantageous to connect the same via a data communications link to a control device of an electronically controlled brake system of the trailer vehicle, so that a data exchange can take place.

According to another embodiment, the control device inhibits the output of a separate emergency braking signal to the light on detecting that the control signal generated by the towing vehicle and supplied to the trailer vehicle is an emergency braking signal. This has the advantage that an emergency braking signal already generated by the towing vehicle and supplied to the trailer vehicle is not corrupted and indicates clear signaling of emergency braking for the following traffic.

According to a further embodiment, a pulsed control signal from the towing vehicle is detected in the control device as an emergency braking signal, and, on detecting the pulsed control signal, the control device does not generate an anti-phase pulsed control signal for the light that cancels the pulsed control signal from the towing vehicle. This has the advantage that a certain phase angle between the pulsed control signal from the towing vehicle and a possibly likewise pulsed control signal generated by the control device does not result in mutual cancellations of the signals output to the brake light. This would be unfavorable because, despite braking, even emergency braking, no signaling at all would be presented to the following traffic. Such situations can be avoided by the present invention. A pulsed signal is understood to mean a signal that is intermittent against time, e.g., a rectangular wave signal that causes pulsed switching-on and -off of the light, which, e.g., has the effect that the light flashes. The control signal generated by the control device for the light is understood to mean a switch-off signal that causes at least temporary switching-off of a light switched on by the towing vehicle.

According to another embodiment of the present invention, the control device, on detecting that the control signal is an emergency braking signal, effects at least one of the following procedures in relation to the operation of the light:

a) it passes the control signal from the towing vehicle to the light, b) it inhibits the control signal from the towing vehicle and outputs a separate pulsed control signal to the light, c) it outputs a separate control signal to the light that is synchronized to the control signal of the towing vehicle.

In case a), the control device can receive the control signal on the input side, and, at least for emergency braking, reproduce it as a separate output signal and output it to the light disposed on the trailer vehicle. In this case, passing through the control signal takes the form of reproducing it as a separate output signal. The control device can pass through the control signal both in the case of emergency braking and also for normal braking or for other driving states, but not if the control device itself has to signal emergency braking and the control signal is not an emergency braking signal. If the light can be directly controlled from the towing vehicle via an electrical line and the control device can only influence the operation of the light by means of an open circuit state of the line, e.g., by means of a relay, then the line is not interrupted by the control device for passing the control signal from the towing vehicle through to the light. The line may be interrupted intermittently only if the control device detects that separate operation of the light is necessary for signaling emergency braking and the control signal is not an emergency braking signal.

Case b) is also suitable for both previously described types of electrical cabling of the light. In the first case, the control device no longer takes into account the control signal of the towing vehicle for generating a separate pulsed control signal, but generates a separate pulsed control signal according to its system settings, which does not necessarily have to be a reproduction of the control signal of the towing vehicle. In the second case, instead of the interruption of the line from the towing vehicle to the light, a changeover can be provided, e.g., by means of a relay, wherein, for inhibiting the control signal from the towing vehicle, the light is electrically isolated from the connection to the towing vehicle and is connected to the control device of the trailer vehicle. This then generates a separate pulsed control signal.

Case c) is also suitable for all previously mentioned circuit versions. The control device synchronizes its separate control signal to the control signal of the towing vehicle, so that clearly identifiable light signals are also output for the following traffic and there are no cancellations.

According to a further embodiment of the present invention, a control device is provided with at least one light control signal input terminal, at least one computer and at least one computer program that can carry out a process according to embodiments of the present invention when the program is executed on the computer. The control device can, e.g., be part of an electronically controlled brake system.

According to another embodiment, a trailer vehicle is provided with at least one inventive control device, at least one light, and at least one electrical connector for connecting an electrical system of the trailer vehicle to an electrical system of the towing vehicle. The light is indirectly connected via at least one electrical line of the electrical system of the trailer vehicle to the electrical connector, such that the light is connected to the connector via the control device or via a shut-off device or changeover device, which can be controlled by the control device. The electrical connector can, e.g., be implemented as a plug connector.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is explained in greater detail below using exemplary embodiments and with reference to the accompanying drawing figures, in which:

FIG. 2 is a schematic diagram depicting a trailer vehicle according to a second embodiment;

FIG. 3 is a schematic diagram depicting a trailer vehicle according to a third embodiment;

FIG. 4 illustrates light control signals according to the prior art;

FIG. 5 illustrates light control signals according to an embodiment of the present invention.

In the figures, the same reference characters are used for corresponding elements.

DETAILED DESCRIPTION OF THE PREFERRED EMBODIMENTS

Figure 1:
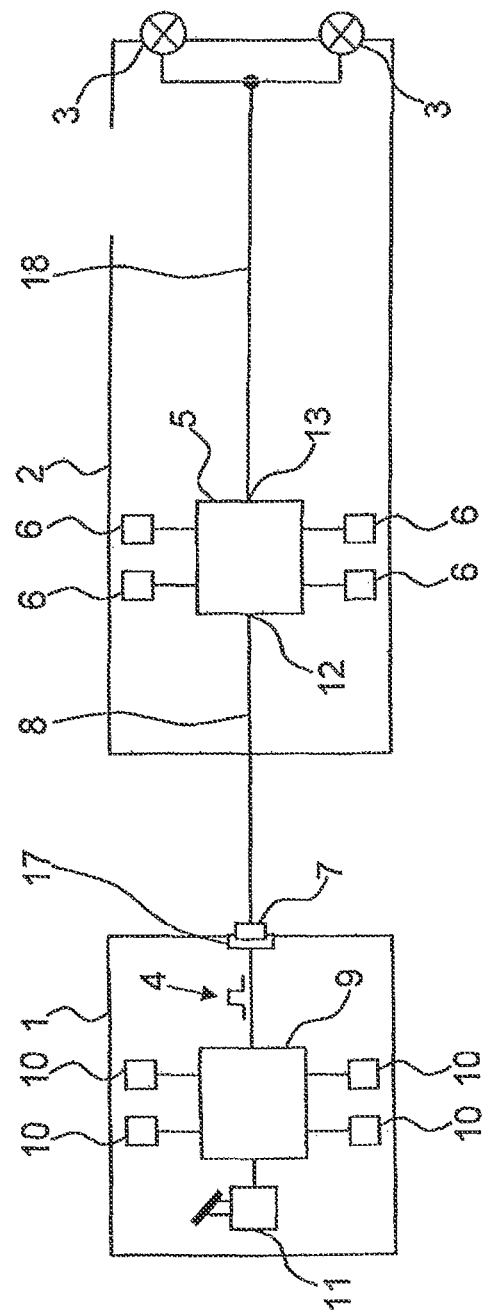
FIG. 1 is a schematic diagram depicting a towing vehicle and a trailer vehicle in accordance with a first embodiment of the present invention.

FIG. 1 shows a towing vehicle 1 with a trailer vehicle 2 coupled to the towing vehicle 1. The towing vehicle 1 and the trailer vehicle 2 additionally comprise the usual operating components for commercial vehicles, i.e., trucks and their trailers. FIGS. 2 and 3 each show only the trailer vehicle 2, which can be coupled to a towing vehicle 1 in the manner shown in FIG. 1.

The towing vehicle 1 comprises a brake system of the electronically controlled type (EBS) or a conventional pneumatic brake system. As part of the brake system, a brake value generator 11 is provided that is coupled to a brake pedal. The brake value generator 11 is, in the case of a conventional pneumatic brake system, coupled to or comprises a pneumatic motor vehicle brake valve. In the case of an EBS, the brake value generator 11 is configured to output an electrical braking value signal, which can be used to determine the strength of braking as a result of brake pedal operation by the driver. The brake value generator 11 is connected to control electronics 9. The control electronics 9 receive the electrical braking value signal from the brake value generator 11, or, in the case of the motor vehicle brake valve, a brake pressure from the brake value generator 11. The control electronics 9 generate, from the signal received from the brake value generator, a control signal 4 for a light, a brake light signal, which is used to control the brake lights of the towing vehicle 1. Using the brake light signal, the control electronics 9 control the brake lights of the towing vehicle 1. In this way, a braking process is signaled to the following traffic.

The control electronics 9 can be configured for implementing other functions, and, for this purpose, can be coupled to other sensors or actuators 10. For example, the control electronics 9 can also be configured as the central control electronics of an EBS.

The control electronics 9 outputs the control signal 4 via an electrical plug connection 7, 17 to an electrical line 8 connected to the trailer vehicle 2. For this purpose, the electrical plug connection 7, 17 can comprise a plug connector 7, which is connected to the electrical line 8 connected to the trailer vehicle 2, and a corresponding mating part 17, into which the plug connector 7 can be plugged. The electrical line 8 is connected in the trailer vehicle 2 to a light control signal input terminal 12 of an electronic control device 5 of the trailer vehicle 2. The electronic control device 5 can, e.g., be part of the brake system of the trailer vehicle 2, e.g., in the form of a controller of an electrically controlled brake system of the trailer vehicle. For this purpose, the electronic control device 5 can be connected to further sensors or actuators 6.

The electronic control device 5 detects the control signal 4 supplied to the light control signal input terminal 12 and analyzes the same. Depending on the result of the analysis, the electronic control device generates at a light output port 13 an electrical light signal, which is supplied via an electrical line 18 to at least one light 3 of the trailer vehicle, in the illustrated exemplary embodiment, the trailer vehicle comprises as a light two brake lights 3 disposed on the rear, which are connected in parallel to the electrical line 18.

FIG. 1 thus shows an exemplary embodiment in which the brake lights 3 are indirectly connected via the electrical line 18 through the interposed electronic control device 5 to the electrical line 8 carrying the control signal 4. The operation of the brake lights 3 is, thus, always carried out actively by means of the electronic control device 5, if the electronic control device 5 detects a control signal 4 corresponding to a normal braking signal at the light control signal input terminal 12, then the electronic control device 5 operates the brake lights 3 likewise with a normal braking signal, which can correspond to or differ from the supplied control signal 4. If the electronic control device 5 detects an emergency braking signal at the light control signal input terminal 12, it operates the brake lights 3 with an emergency braking signal that can correspond to or differ from the supplied control signal 4.

The electronic control device 5 can also be configured with a function for generating a separate emergency braking signal. In this case, the electronic control device 5 also operates the brake lights 3 with an emergency braking signal even if the control signal 4 is not an emergency braking signal. If the control signal 4 is an emergency braking signal and the electronic control device 5 additionally generates a separate emergency braking signal itself, then the electronic control device 5 operates the brake lights 3 with an emergency braking signal, which can correspond to the separately generated emergency braking signal of the electronic control device 5 or to the control signal 4, or can be an emergency braking signal that is modified relative to the signals.

FIG. 2 shows a second embodiment of a trailer vehicle that corresponds to the embodiment according to FIG. 1, apart from the differences explained below. According to FIG. 2, the electrical line 8 is connected via a shut-off device 15 to the electrical line 18, to which the brake lights 3 are connected. The shut-off device 15 is arranged to make or break the connection between the lines 8, 18. For this purpose, the shut-off device 15 is connected to a control terminal 14 of the electronic control device 5. The shut-off device 15 can, e.g., be configured as a relay or as an electronic semiconducting switch. The electronic control device 15 is connected via its light control signal input terminal 12, as with the embodiment according to FIG. 1, to the electrical line 8 and receives thereby the control signal 4. The electronic control device 5 controls the shut-off device 15 by means of the control terminal 14 such that the line 18, apart from the case explained below, is always connected to the line 8. In this way, the control signal 4 from the towing vehicle 1 is always passed through to the brake lights 3.

If the electronic control device 5 detects a need to generate a separate emergency braking signal, then it first checks whether the control signal 4 is an emergency braking signal. If this is the case, the electronic control device 5 does not carry out separate operation of the brake lights 3, but maintains the state of the shut-off device 15 in which the line 18 is connected to the line 8. If the control signal 4 is not an emergency braking signal, the electronic control device 5 outputs a separate emergency braking signal to the brake lights 3 by intermittently switching the shut-off device by means of the control output 14, so that the connection between the line 18 and the line 8 is intermittently interrupted. In this way, a control signal 4 that otherwise causes permanent switch-on of the brake lights 3 is intermittently interrupted, so that emergency braking is signaled to the following traffic by flashing of the brake lights 3.

FIG. 3 shows a third embodiment of the trailer vehicle 2 that corresponds to the embodiments according to FIGS. 1 and 2 apart from the following differences. The difference from FIG. 2 is that, in FIG. 3, instead of a shut-off device 15, a changeover device 16 is provided, which is arranged not only to open and close the electrical connection between line 18 and line 8, but to connect line 18 to a light output port 13 of the electronic, control device 5 when the connection to line 8 is opened. This type of cabling in FIG. 3 has the advantage that the brake lights 3 can also be actively operated by the electronic, control device 5, even if the control signal 4 does not involve operation of the brake lights 3 or does not involve continuous operation thereof. For the embodiment according to FIG. 3, the electronic control device 5 always switches the changeover device 16 in cases in which it does not have to output a separate emergency braking signal such that line 18 is connected to line 8. If the electronic control device 5 has to output a separate emergency braking signal, it switches over the changeover device 16 so that the line 18 is connected to the light output port 13.

FIG. 4 shows a sequence of light control signals according to the prior art. A signal sequence 40 is illustrated as a type of pulsed light control signal, wherein a uniform rectangular wave signal is assumed. The signal sequence 40 is the control signal generated by the towing vehicle 1 in the form of an emergency braking signal. The signal sequence 41 illustrated thereunder is an emergency braking signal separately generated by the electronic control device 5 of the trailer vehicle 2. The signal sequence 41 is the same as signal sequence 40 in respect of the frequency and the rest of the signal shape; however, signal sequence 41 is in exact anti-phase to signal sequence 40.

A low signal level of the signals shown in FIGS. 4 and 5 is intended to represent switching-off of a brake light 3; a high signal level represents switching-on.

If the signal sequences 40, 41 are generated, e.g., for the embodiment of the trailer vehicle according to FIG. 2, the signal sequence 42 shown to the right would result, which would cause the brake lights 3 to be permanently switched off, because the switch-on phases of the one signal sequence 40 exactly coincide with the switch-off phases of the other signal sequence 41 and vice-versa.

FIG. 5 shows light signal generation according to an embodiment of the present invention. A control signal of the towing vehicle 1 is, in turn, shown as signal sequence 50, wherein it is assumed that signal sequence 50 corresponds to signal sequence 40. The electronic control device 5 of the trailer vehicle 2 detects control signal 4 of the towing vehicle 1 and, hence, signal sequence 50 and analyzes it, if the electronic control device 5 detects that signal sequence 50 is an emergency braking signal, the electronic control device 5 generates signal sequence 51 as a separate control signal for the brake lights 3, which is synchronized with signal sequence 50, wherein a certain phase shift 53 is allowed, in this way, the brake lights 3 are subjected to a signal sequence 52, which, as can be seen on the right in FIG. 5, still causes identifiable signaling of emergency braking, even if it no longer corresponds exactly to the control signal 4.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for signaling a braking process on a trailer vehicle coupled to a towing vehicle, at least one light disposed on the trailer vehicle being operable for emergency braking with an emergency braking signal and operable for a different driving state with a normal signal, the emergency braking signal causing different operation of the at least one light than the normal signal, and the at least one light being controllable by a control signal of the towing vehicle and by at least one control device disposed on the trailer vehicle, the at least one control device comprising at least one data processor, the method comprising using the at least one data processor to detect and analyze a control signal comprising a pulsed control signal for operating the at least one light that is generated by the towing vehicle and supplied to the trailer vehicle; identify the pulsed control signal as being an emergency braking signal; and, based on the identified pulsed control signal, avoiding generation of an anti-phase pulsed control signal for the at least one light that would cancel the pulsed control signal from the towing vehicle.

2. The method as claimed in claim 1, further comprising using the at least one data processor to one of:
   a) pass the control signal from the towing vehicle through to the at least one light,
   b) inhibit the control signal from the towing vehicle and outputting a separate pulsed control signal to the at least one light, and
   c) output a separate control signal to the at least one light that is synchronized with the control signal from the towing vehicle.

3. The method as claimed in claim 1 further comprising, when the control signal is determined to correspond to a driving state other than an emergency braking situation, using the at least one data processor to determine whether a braking process of the trailer vehicle is emergency braking, and operate the at least one light with an emergency braking signal generated by the at least one control device, based on at least one of (i) at least one sensor signal of at least one sensor disposed on the trailer vehicle and delivered to the at least one control device and (ii) braking data supplied to the at least one control device from the towing vehicle.

4. A control device, comprising at least one light control signal input terminal; and at least one data processor, the control device being configured to carry out a method for signaling a braking process on a trailer vehicle coupled to a towing vehicle, the trailer vehicle having at least one light operable for emergency braking with an emergency braking signal, operable for a different driving state with a normal signal, and controllable by the at least one data processor and by a control signal of the towing vehicle, the method comprising using the at least one data processor to detect and analyze a control signal comprising a pulsed control signal for operating the at least one light that is generated by the towing vehicle and supplied to the trailer vehicle, identify the pulsed control signal as being an emergency braking signal, and, based on the identified pulsed control signal, avoiding generation of an anti-phase pulsed control signal for the at least one light that would cancel the pulsed control signal from the towing vehicle.

5. A trailer vehicle, comprising a control device having at least one light control signal input terminal and at least one data processor; at least one light being operable for emergency braking with an emergency braking signal, operable for a different driving state with a normal signal, and controllable by the at least one data processor and by a control signal of a towing vehicle; and an electrical connector configured to connect an electrical system of the trailer vehicle to an electrical system of the towing vehicle, wherein the at least one light is indirectly connected to the electrical connector via at least one electrical line of the electrical system of the trailer vehicle such that the at least one light is connectable to the electrical connector via the control device and a switch controllable by the at least one data processor, the control device being configured to carry out a method for signaling a braking process on the trailer vehicle, the method comprising using the at least one data processor to detect and analyze a control signal comprising a pulsed control signal for operating the at least one light that is generated by the towing vehicle and supplied to the trailer vehicle, identify the pulsed control signal as being an emergency braking signal, and, based on the identified pulsed control signal, avoiding generation of an anti-phase pulsed control signal for the at least one light that would cancel the pulsed control signal from the towing vehicle.

6. A method for signaling a braking process on a trailer vehicle coupled to a towing vehicle, at least one brake light disposed on the trailer vehicle being operable for emergency braking with an emergency braking signal and operable for a different driving state with a normal signal, the emergency braking signal causing different operation of the at least one brake light than the normal braking signal, and the at least one brake light being controllable by a brake light signal of the towing vehicle and by at least one control device disposed on the trailer vehicle, the at least one control device comprising at least one data processor, the method comprising using the at least one data processor to detect and analyze a brake light signal comprising a pulsed control signal for operating the at least one brake light that is generated by the towing vehicle and supplied to the trailer vehicle; identify the pulsed control signal as being an emergency braking signal; and, based on the identified pulsed control signal, avoiding generation of an anti-phase pulsed control signal for the at least one brake light that would cancel the pulsed control signal from the towing vehicle.

* * * * *